US009823063B2

(12) United States Patent
Lopez De Arbina Echeverria et al.

(10) Patent No.: US 9,823,063 B2
(45) Date of Patent: Nov. 21, 2017

(54) MACHINE AND METHOD FOR ACQUIRING DATA FOR MEASURING THE TWIST AND CONCAVITY OF AGRICULTURAL DISCS

(71) Applicant: BELLOTA AGRISOLUTIONS, S.L., Legazpia (Guipuzcoa) (ES)

(72) Inventors: Maria Lourdes Lopez De Arbina Echeverria, Legazpia (ES); Jeni Galdos Ormategui, Legazpia (ES); Miguel Ignacio Echeverria Alcorta, Legazpia (ES)

(73) Assignee: BELLOTA AGRISOLUTIONS, S.L., Legazpia (Guipúzcoa) (ES)

( * ) Notice: Subject to any disclaimer, the term of this patent is extended or adjusted under 35 U.S.C. 154(b) by 54 days.

(21) Appl. No.: 14/407,098

(22) PCT Filed: Jun. 10, 2013

(86) PCT No.: PCT/ES2013/070375
§ 371 (c)(1),
(2) Date: Dec. 11, 2014

(87) PCT Pub. No.: WO2013/186414
PCT Pub. Date: Dec. 19, 2013

(65) Prior Publication Data
US 2015/0160004 A1 Jun. 11, 2015

(30) Foreign Application Priority Data
Jun. 12, 2012 (ES) .................................. 201230907

(51) Int. Cl.
*G01B 11/255* (2006.01)
*G01B 11/30* (2006.01)
(52) U.S. Cl.
CPC .......... *G01B 11/255* (2013.01); *G01B 11/306* (2013.01)

(58) Field of Classification Search
CPC . G01B 11/306; G01B 11/255; G01B 11/2441; G01B 11/24; G01B 11/303;
(Continued)

(56) References Cited

U.S. PATENT DOCUMENTS

| 3,951,563 A * | 4/1976 | Ravenhall ............... G01B 7/315 |
| | | 29/894.325 |
| 4,084,350 A * | 4/1978 | Ongaro ................... B24B 5/366 |
| | | 451/254 |

(Continued)

FOREIGN PATENT DOCUMENTS

| ES | 2 362 529 | 7/2011 |
| JP | 10-89936 | 4/1998 |
| JP | 2010076009 A * | 4/2010 |

OTHER PUBLICATIONS

International Search Report dated Oct. 30, 2013 in International (PCT) Application No. PCT/ES2013/070375.

*Primary Examiner* — Tarifur Chowdhury
*Assistant Examiner* — Mohamed K Amara
(74) *Attorney, Agent, or Firm* — Wenderoth, Lind & Ponack, L.L.P.

(57) ABSTRACT

The machine includes a rotational mounting bracket, upon which an agricultural disc is supported and held. A hold-down plate that can rotate freely is arranged above the mounting bracket. A linear actuator displaces the hold-down plate vertically in a downwards direction to press the agricultural disc. A laser measurement device is coupled to a linear guide where the hold-down plate forms part of a rotational head-piece fixed to a rod of the linear actuator. A method includes determining a central reference height on a model disc, determining the height of points in the periphery of the disc to be measured, calculating the average of the (Continued)

measured heights and comparing with the central reference height to determine whether the disc is valid or not.

4 Claims, 5 Drawing Sheets

(58) Field of Classification Search
  CPC .......... G01B 9/02039; G01B 2290/70; G01B 11/06; G01B 11/16; G01B 9/02057; G01B 11/026; A61B 3/107; G01M 11/025; G01M 11/0271; G01M 1/04; G01M 1/16; G01M 1/34; B21B 38/02; B21B 37/42; B21B 37/44; B21B 37/54; G01N 21/8806; G01N 21/9501; G01N 21/9506; G01J 3/0262; G11B 7/00375; G11B 11/10582; G11B 7/08541; G11B 7/0903; G11B 7/0945; G11B 7/0956; G11B 7/26; G11B 7/263
  See application file for complete search history.

(56) References Cited

U.S. PATENT DOCUMENTS

| | | | |
|---|---|---|---|
| 4,495,812 A | 1/1985 | Gorris | |
| 4,644,635 A * | 2/1987 | Murai | B23Q 1/54 269/71 |
| 5,179,545 A * | 1/1993 | Tanaka | G11B 7/08517 369/30.14 |
| 5,956,188 A * | 9/1999 | Lee | G11B 7/0933 359/822 |
| 5,983,167 A | 11/1999 | Ebisawa | |
| 6,002,656 A | 12/1999 | Miyagawa et al. | |
| 6,486,963 B1 | 11/2002 | Holec | |
| 6,721,244 B2 * | 4/2004 | Kubota | G11B 7/08511 369/112.01 |
| 7,243,357 B1 * | 7/2007 | Taniguchi | G11B 17/021 369/30.55 |
| 9,338,939 B1 * | 5/2016 | Cadieux | A01C 7/046 |
| 2002/0126589 A1 * | 9/2002 | Osada | G11B 7/007 369/44.23 |
| 2005/0236780 A1 * | 10/2005 | Wolters | B23B 31/1175 279/2.1 |
| 2006/0090361 A1 * | 5/2006 | Matsuda | G01B 11/24 33/503 |
| 2006/0280062 A1 | 12/2006 | Ichihara | |
| 2007/0084004 A1 * | 4/2007 | Shizawa | A46B 5/0012 15/77 |
| 2013/0300861 A1 * | 11/2013 | Neumann | G01B 21/02 348/135 |

* cited by examiner

MACHINE AND METHOD FOR ACQUIRING DATA FOR MEASURING THE TWIST AND CONCAVITY OF AGRICULTURAL DISCS

OBJECT OF THE INVENTION

The present invention, as expressed in this descriptive specification, relates to a machine and method for acquiring data for measuring the twist and concavity of agricultural discs.

The machine is designed to measure both the twist and the concavity of agricultural discs, quickly and automatically, with a high level of precision, by means of a laser measurement device compared within.

The twist and concavity of the agricultural discs are measured in order to comply with pre-established technical specifications, used to check the quality of the end product obtained.

BACKGROUND OF THE INVENTION

In the current times, agricultural discs must be submitted to quality control tests once they have been manufactured. These tests check whether or not the manufactured agricultural discs comply with a number of pre-established technical specifications.

The technical specifications to be revised include those related to twist and concavity at the disc surface.

Currently, the specifications are usually measured manually by means of a dial indicator. This instrument is used to test twist and concavity, determining whether or not these variables fall within established tolerance levels.

This method is very slow if large amounts of measurements are to be made, due to the limitations related with the agricultural disc fastener used to make the measurements.

Likewise, the precision with which this method is carried out depends on the skill of the person using the dial indicator.

SUMMARY OF THE INVENTION

With the focus on achieving the aims and avoiding the limitations set out above, a first object of the invention constitutes a machine for acquiring data for measuring the twist and concavity of agricultural discs, comprising:
  a rotational mounting bracket, upon which an agricultural disc is supported and held.
  a hold-down plate, free to rotate, arranged above the mounting bracket, both elements facing one another in the same vertical direction;
  a linear actuator, which displaces the hold-down plate vertically in a downwards direction, pressing the same down and butting against a central area of an upper surface of the agricultural disc placed on the mounting bracket, whilst in other positions above the hold-down plate, the same is distanced from the agricultural disc;
  a laser measurement device, arranged above the agricultural disc to be measured, which in turn, is coupled to a linear guide arranged in a direction perpendicular to the vertical direction in which the hold-down plate moves, which coincides with the vertical direction around which the mounting bracket rotates;
  a frame, upon which the various elements of the machine are supported.

Once the agricultural disc has been immobilized and is held between the mounting bracket arranged below and the hold-down plate arranged above, the agricultural disc is rotated by means of the rotational activation of the mounting bracket.

In one embodiment of the invention, the location of the agricultural disc comprises a space delimited by a rear protection surface, two side surfaces and a table platform, above which the mounting bracket protrudes.

The table platform is joined to some legs, which form part of the frame of the machine.

The hold-down plate forms part of a rotational head-piece, fixed to the rod of a vertical cylinder by means of a female sleeve, the vertical cylinder constituting the linear actuator for vertically displacing the hold-down plate.

Moreover, the rotational head-piece comprises a lower fixation sleeve, upon which the hold-down plate is supported; an upper fixation sleeve, coupled to the female sleeve and; an intermediate axial load ball bearing, placed between both fixation sleeves.

The intermediate ball bearing is housed in a hollow, delimited by an end annular recess in the female sleeve and by circumferential portions of both fixation sleeves, i.e., the upper and lower fixation sleeves, both being joined by means of screws.

The lower fixation sleeve has at least one built in appendix, wherein the hold-down plate is engaged, which is immobilized by means of a number of set screws, the ends of which fit in a number of blind grooves in the lower fixation sleeve appendix.

The hold-down plate has a first built in annular stop, which presses against the upper face of the agricultural disc to be controlled, whilst the mounting bracket has a second built in annular stop, upon which the agricultural disc is supported on its lower face.

The mounting bracket is built into an actuator device fixed to the machine frame and rotates as a result of being driven by a motor, also fixed to the machine frame.

The actuator device comprises a casing, fixed to the machine frame, which supports a vertical shaft that rotates as a result of being driven by the aforementioned motor, the mounting bracket being engaged in an upper end stretch of the vertical shaft, whilst the mounting bracket rests against an annular extension of the vertical shaft.

Another characteristic of the invention is that the actuator device includes ball bearings, interspersed in the coupling of the vertical shaft, relative to the casing of the actuator device.

It must also be noted that the upper end of the vertical shaft of the actuator device has a housing built into its center, in which a male element is engaged, where a central perforation of the agricultural disc is adjusted, in addition to a central perforation of a model disc, initially placed in order to determine a central reference point, as shall be described further on.

A second object of the invention relates to a method for acquiring data for measuring the twist and concavity of agricultural discs.

The method comprises the following stages:
  Placing the model disc in the center of the mounting bracket.
  Positioning the laser measurement device in a central area of the model disc, above the same.
  Rotating the model disc, in order to use the laser measurement device to obtain reference data corresponding to points at an equal distance away from the center of the model disc, in order to determine a central reference height corresponding to the center of the model disc. These points are measured relative to a start point in the machine located in correspondence with the laser device, taking into account the height of each one of the points relative to the cited start point.

Once the central reference height has been determined, the model disc is dismounted and the process for measuring the agricultural discs continues, each agricultural disc to be measured being mounted in the center of the mounting bracket, ensuring the same is immobilized by lowering the hold-down plate.

The laser measurement device is displaced, in order to be positioned such that it corresponds with the periphery of the agricultural disc.

Measurements are made in order to obtain data (at points along the perimeter) along the perimeter of the agricultural disc, as the same rotates, using the laser measurement device.

Both the twist and concavity of the agricultural disc are calculated using the measurement data acquired.

The twist of the agricultural disc calculated corresponds to the difference in height between the maximum and minimum measurements acquired in the data, this measurement data corresponding to the heights measured from the start point of the laser measurement device and the points chosen along the periphery of the agricultural disc, when they are facing the start point in the laser measurement device, height values thereby being obtained.

The difference in height between the resulting values obtained is subsequently compared against pre-established tolerance limits, in order to determine whether or not the agricultural disc is valid in terms of twist.

Concavity is measured in accordance with diametrical axes in each agricultural disc, in such a way that concavity is calculated taking the measurement data corresponding the heights, acquired from several pairs of diametrically opposed peripheral points on the agricultural disc, with respect to the start point and the height of the central reference point.

The following are calculated in accordance with each diametrical axis: a first distance between the start point of the laser measurement device and a point along the periphery of the agricultural disc, and a second distance between the start point of the laser device and a diametrically opposed point of the agricultural disc periphery. These distances constitute vertical magnitudes (heights).

The average between the first and second distances is subsequently calculated and the average is then compared to the central reference height of the model disc, the difference between both constituting the concavity of the axis.

Finally, the average of the concavities of the axes measured is found and compared with pre-established tolerance levels, in order to determine whether or not the agricultural disc is valid in terms of concavity.

The reference data pertaining to the model disc is obtained as follows:
  A first piece of data is taken prior to setting the model disc into rotational motion.
  A second piece of data is taken as the agricultural disc moves rotationally at 0.9 seconds.
  A third piece of data is taken at 1.8 seconds, keeping the agricultural disc in rotational movement.
  A fourth piece of data is taken at 2.7 seconds, keeping the agricultural disc in rotational motion.

The measurement data (points) chosen along the periphery of the agricultural disc are taken by rotating the agricultural disc by one full turn, plus a portion of a second turn, with a time interval of at least 0.001 seconds.

From the measurement data obtained, a few pieces of specific data are chosen, in order to calculate concavity, these pieces of data being chosen as follows:
  A first piece of data, which is chosen at 0.8 seconds after the agricultural disc begins to rotate.
  A second piece of data is collected at 1.465 seconds.
  A third piece of data is collected at 2.13 seconds.
  A fourth piece of data is collected at 2.795 seconds.
  A fifth piece of data is collected at 3.46 seconds.
  A sixth piece of data is collected at 3.325 seconds.

Below, in order to facilitate better understanding of the present descriptive specification, a number of drawings are attached, which form an integral part of the same and provide a non-limiting illustration of the object of the invention.

DESCRIPTION OF AN EXEMPLARY EMBODIMENT OF THE INVENTION

Figure 1:
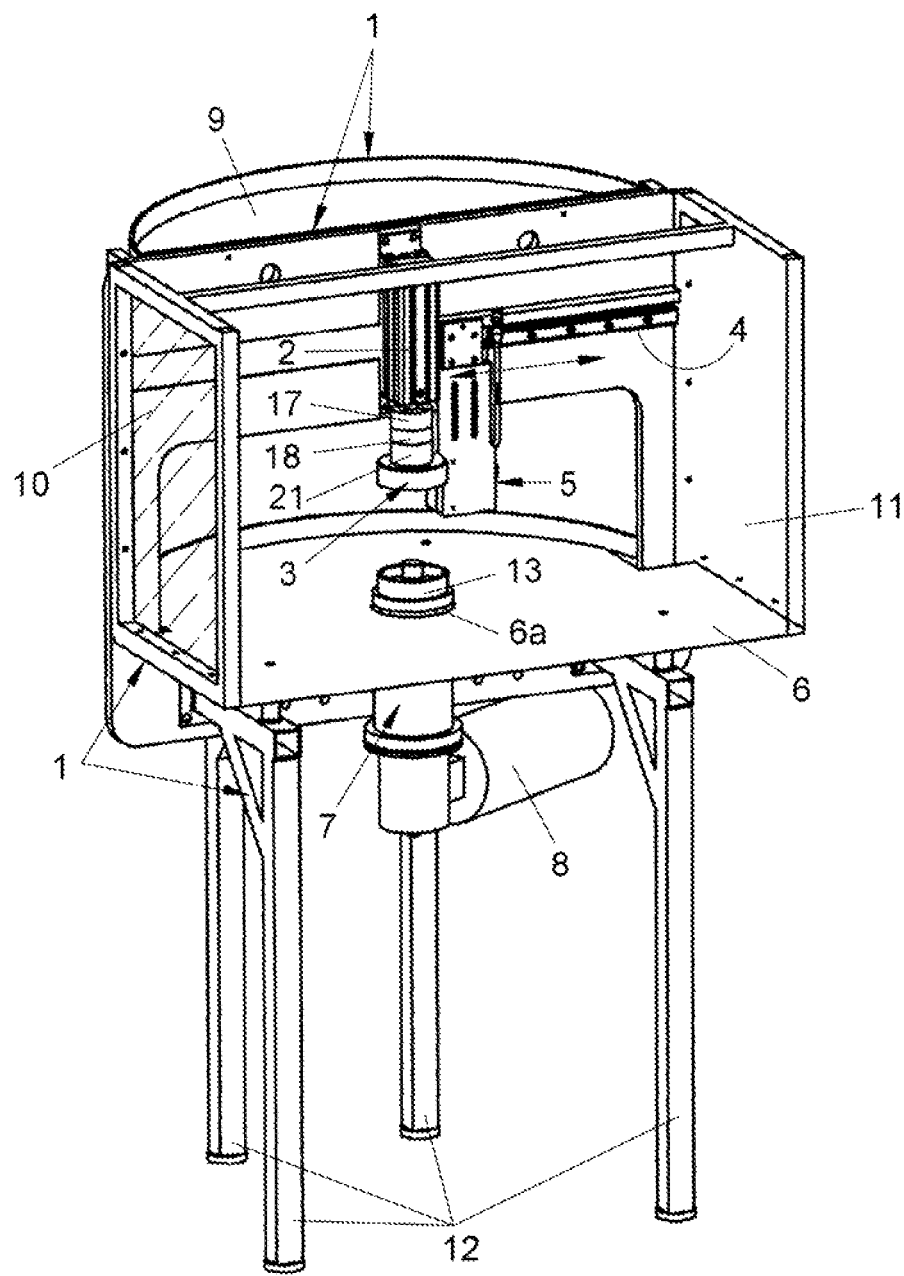
FIG. 1.—Is a perspective view of the machine for acquiring data for measuring the twist and concavity of agricultural discs.
Figure 2:
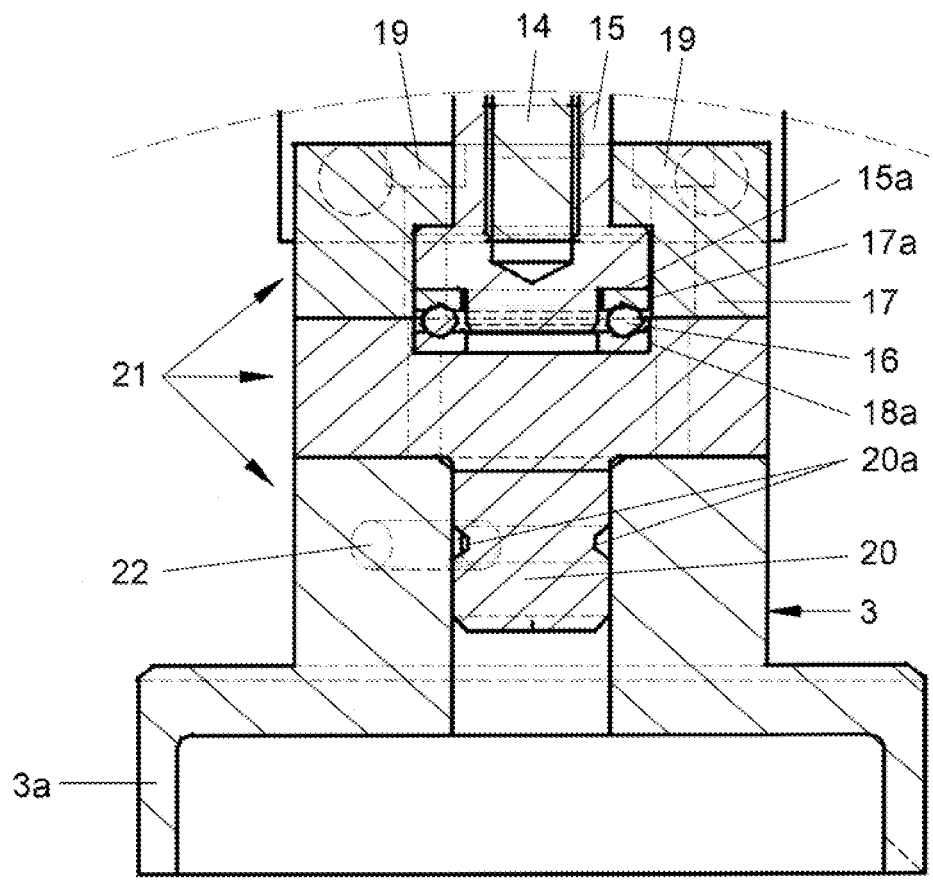
FIG. 2.—Is a cross-section of a rotational head and hold-down plate assembly.
Figure 3:
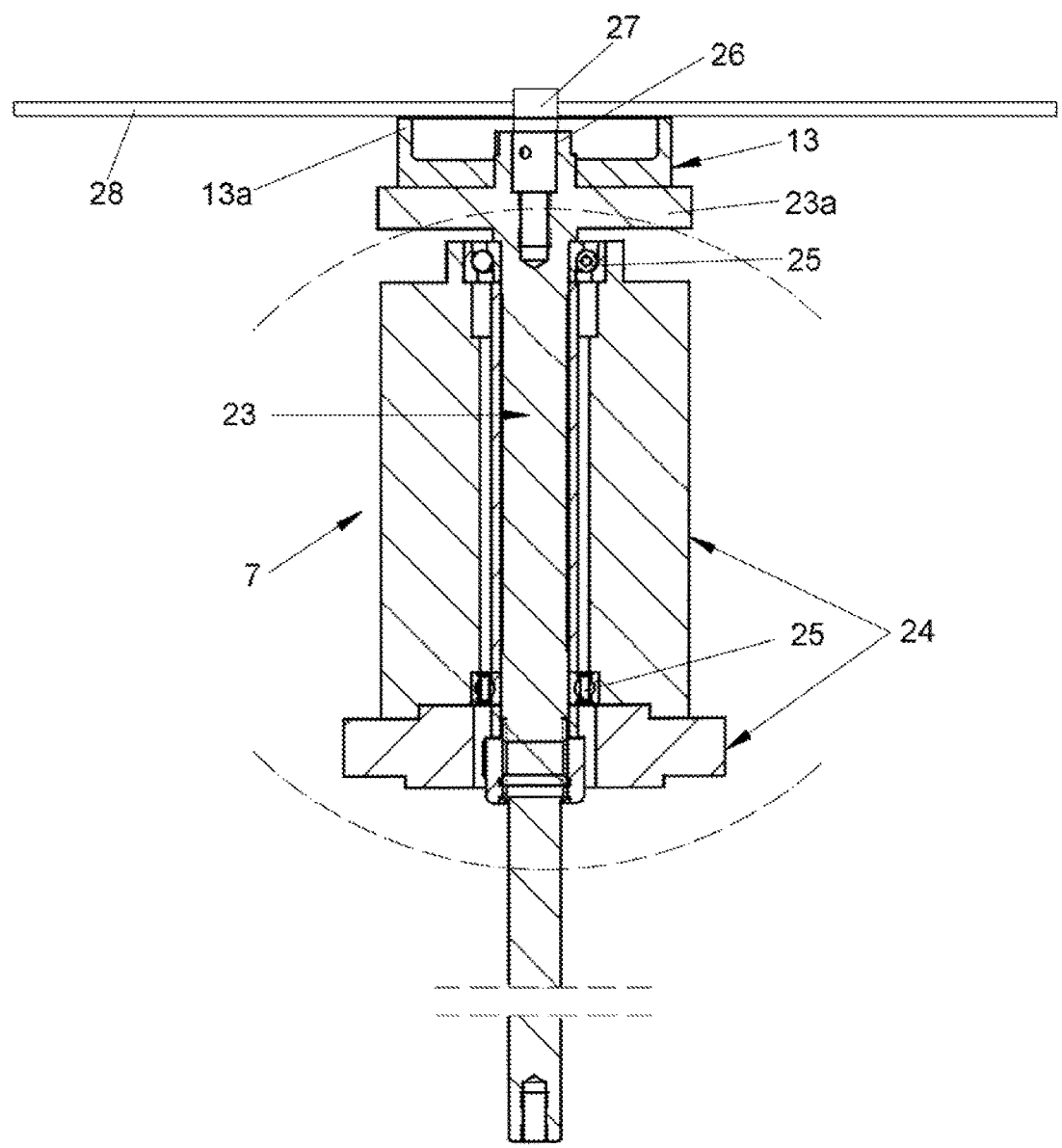
FIG. 3.—Is a cross-section of an actuator device, with a built-in vertical shaft, the upper end of which is fixed to the mounting bracket, the assembly formed by the vertical shaft and the mounting bracket being rotated by means of a motor.
Figure 4:
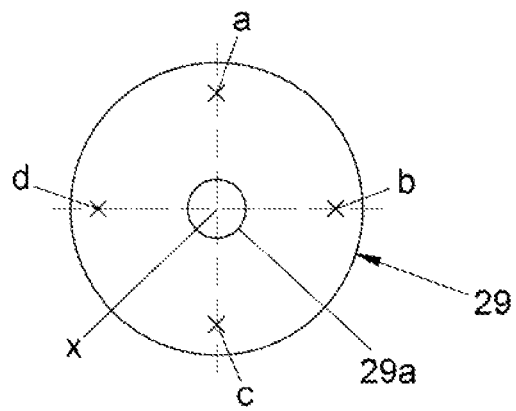
FIG. 4.—Is a plan view of a model disc, initially used to identify a central reference point.
Figure 5:
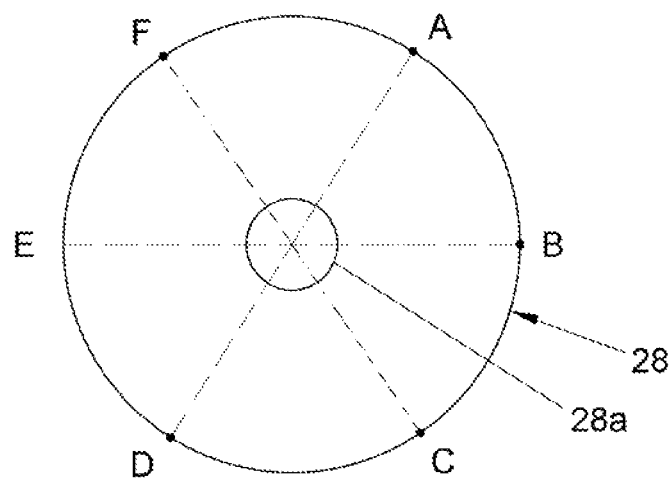
FIG. 5.—Is a plan view of an agricultural disc with various reference points around the perimeter.
Figure 6:
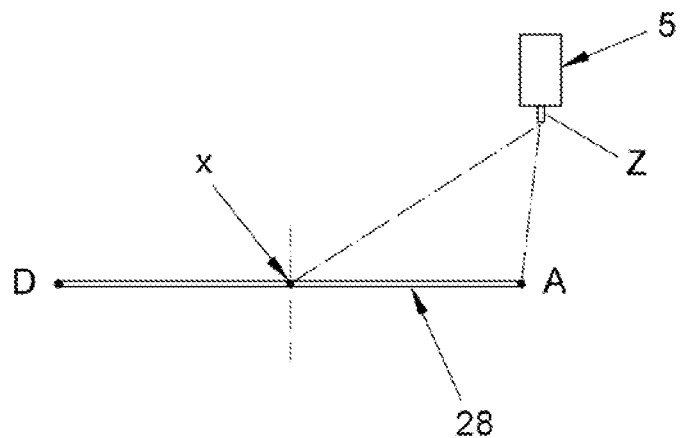
FIGS. 6 and 7.—Are schematic views providing a basic representation of the system for measuring twist and concavity, by taking data at the periphery of the agricultural disc, in addition to a central reference point that corresponds to the center of the agricultural disc.
Figure 7:
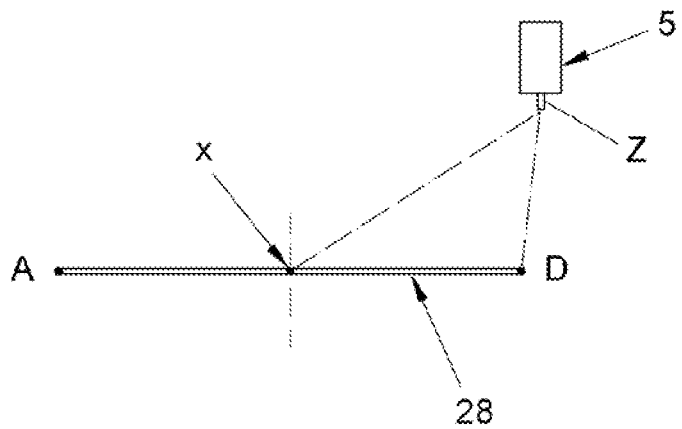

The machine for acquiring data for measuring the twist and concavity of agricultural discs comprises the following elements, listed according to the numbering adopted in the drawings:
1.—Frame
2.—Vertical cylinder
3.—Hold-down plate
3a.—First annular end
4.—Linear guide
5.—Laser measurement device
6.—Table platform
6a.—Hole
7.—Actuator device
8.—Motor
9.—Rear protection surface
10.—Side protection surface
11.—Side protection surface
12.—Legs
13.—Mounting bracket
13a.—Second annular end
14.—Rod
15.—Female sleeve
15a.—End annular recess
16.—Intermediate ball bearing
17.—Upper fixation sleeve
17a.—Circumferential portion
18.—Lower fixation sleeve 18a. Circumferential portion
19.—Screws
20.—Appendix
20a.—Blind grooves
21.—Rotational head-piece
22.—Set screws
23.—Vertical shaft
23a.—Annular extension
24.—Casing
25.—Ball bearings
26.—Housing
27.—Male element
28.—Agricultural disc
28a.—Central perforation
29.—Model disc
29a.—Central perforation In principle, it comprises a frame 1, a rear protection surface 9 and two side protection surfaces 10-11, which define a frontally open surrounding space.

A vertical cylinder 2 is installed in the upper area on the frame 1, which may be pneumatic or hydraulic and is responsible for driving a hold-down plate 3 that forms part of a rotational head-piece 21 connected to the rod 14 of the vertical cylinder 2 by a female sleeve 15, which threads onto the rod 14. Likewise, a linear guide 4 is fixed onto the frame 1, upon which a laser measurement device 5 is displaced.

Furthermore, the machine has a table platform 6 supported by means of legs 12, the legs 12 in turn being supported on the machine frame 1 itself.

An actuator device 7 is mounted to the lower portion of this frame 1, a mounting bracket 13 protruding from the actuator device 7 through a hole 6a made in the table platform 6.

The female sleeve 15 has an end annular recess 15a, in which an intermediate axial load ball bearing 16 is inserted, the same being held using two fixation sleeves, namely an upper 17 fixation sleeve and a lower 18 fixation sleeve, both being joined with screws 19.

The intermediate ball bearing 16 is housed in a hollow delimited by the end annular recess 15a in the female sleeve and by circumferential portions 17a and 18a of both fixation sleeves, namely the upper 17 and lower 18 fixation sleeves, respectively.

The lower fixation sleeve 18 has an appendix 20 to which the hold-down plate 3 is coupled with screws 22, the ends of which fit into a number of blind grooves 20a in the appendix 20 of the lower fixation sleeve 18.

The rotational head-piece 21 in turn comprises the two fixation sleeves, i.e. the upper 17 and lower 18 fixation sleeves, alongside the hold-down plate 3.

In turn, the actuator device 7 is formed by a casing 24, which is fixed to the frame 1. Inside the casing 24, there is a vertical shaft 23, supported by ball bearings 25. In correspondence with the lower end of the vertical shaft 23, a motor 8 is coupled, which provides the vertical shaft 23 and as such, the mounting bracket 13, with rotational movement.

In contrast, the upper end of the vertical shaft 23 is inserted into the mounting bracket 13, which has a housing 26 at its center, in order for a male element 27 to be inserted therein, where a central perforation 28a of the agricultural disc 28 to be measured is adjusted, a perforation 29a of a model disc 29 initially placed on the mounting bracket 13 also being adjusted.

It must also be noted that the mounting bracket 13 is supported against an annular extension 23a of the vertical shaft 23.

Having sufficiently described the structure of the machine, object of the invention, we shall now go on to describe how the machine works.

The agricultural disc to be measured is inserted into the male element 23, whilst it is supported against the mounting bracket 13. The vertical cylinder 2 is subsequently driven, the hold-down plate 3 therefore being lowered until an annular stop 3a of the hold-down plate 3 comes into contact with the agricultural disc 28, fixing it against the mounting bracket 13.

The motor 8 drives the rotation of the vertical shaft 23, also making the mounting bracket 13 rotate jointly and, the hold on the agricultural disc 28 provided by the hold-down plate 3 onto the mounting bracket means that activating the motor 8 also causes the rotational head-piece 21 assembly including the hold-down plate 3 to be pulled.

The laser measurement device 5 takes data measurements as the agricultural disc 28 rotates.

The data taken by the laser measurement device 5 is stored in a PLC, in order to subsequently calculate the twist and concavity of the agricultural disc 28 using a computer program, thereby checking whether or not the agricultural disc 28 complies with the required specifications previously set down.

Should the disc fall within the required tolerance limits, the machine will emit a green light, whilst if it does not, the same will emit a red light.

The method for acquiring data for measuring the twist and concavity of agricultural discs is as follows:

Firstly, at the start of the day, a central reference height is measured using the model disc 29, in accordance with a central point "X" on the model disc 29.

In order to do so, the laser measurement device 5 is positioned along the linear guide 4, such that it corresponds with the central area of the model disc 29 fitted onto the male element 27 by means of its central perforation 29a, the hold-down plate being kept in an upper position.

In the position, the model disc 29 is made to rotate and reference data corresponding to four points a-b-c-d at an equal distance from the center of the model disc 29 are taken, in order to determine the central reference height. The points are measured relative to a start point "Z" in the machine, located such that it corresponds with the laser measurement device 5, the heights between each one of the points relative to the start point "Z" being taken into account, the average value of the heights corresponding to the reference data subsequently being calculated, in order to thus obtain the central reference height of the model disc 29.

The reference data is acquired as follows:

a first piece of data "a" is taken before beginning to rotate the model disc 29.

The model disc 29 is then set into rotational motion.

A second piece of data "b" is taken at 0.9 seconds.

A third piece of data "c" is taken at 1.8 seconds.

A fourth piece of data "d" is taken at 2.7 seconds.

Once the central reference height has been calculated, the model disc 29 is dismounted and each agricultural disc 28 to be measured is mounted, a number of pieces of measurement data being taken for the different agricultural discs 28 to be measured, in order to calculate the twist and concavity, this measurement data corresponding to the heights measured from the start point "Z" of the laser measurement device 5 and each one of the points along the periphery of the corresponding agricultural disc 28.

In order to calculate concavity and twist, the laser measurement device 5 is displaced along the linear guide 4 to the periphery of the agricultural disc 28 to be measured, where it will collect data corresponding to the periphery (points along the perimeter) of the agricultural disc 28 at very short time intervals of at least 0.001 seconds.

From the data acquired in previous steps, six pieces of measurement data corresponding to specific points (A, B, C, D, E and F) are used to calculate concavity, which correspond to three diametrical axes of the agricultural disc 28: A-D, B-E and C-F.

When the agricultural disc begins to rotate, 0.8 seconds pass without collecting or taking data. Subsequently, the data used to calculate concavity is collected as follows, as the agricultural disc 28 is in rotational movement:

Data "A" is collected at 0.8 seconds after the agricultural disc 28 begins to rotate.
Data "B" is collected at 1.465 seconds.
Data "C" is collected at 2.13 seconds.
Data "D" is collected at 2.795 seconds.
Data "E" is collected at 3.46 seconds.
Data "F" is collected at 3.325 seconds.

Once the laser measurement device 5 has collected the last piece of data, the agricultural disc 28 continues to rotate for a further 1.465 seconds, until the hold-down plate 3 is lifted.

All of the data is collected by rotating the agricultural disc 28 by one full turn, plus a portion of a second turn on the mounting bracket 13.

The laser measurement device 5 collects data as follows: a laser diode emits a beam, which crosses an emitter lens and crashes against the upper surface of the agricultural disc 28. The beam reflected from the agricultural disc 28 is subsequently collected by a reflective lens and sent to a sensor, which detects the intensity peak, thereby establishing the distance from the agricultural disc 28.

The twist of the agricultural disc 28 is calculated in accordance with the data collected and corresponds to the difference in height (the direction perpendicular to the plane of the agricultural disc 28) between the maximum and minimum values of all the measurement data acquired along the periphery of the agricultural disc.

In contrast, the concavity of the agricultural disc 28, in accordance with the data collected, is calculated as follows:

First of all, in one embodiment of the invention, the concavity of three diametrical axes of the agricultural disc 28 are calculated:

Concavity of a first axis:
$$(AD) = \frac{\text{distance}(ZA) + \text{distance}(ZD)}{2} - \text{distance}(ZX)$$

Concavity of a second axis:
$$(BE) = \frac{\text{distance}(ZB) + \text{distance}(ZE)}{2} - \text{distance}(ZX)$$

Concavity of a third axis:
$$(CF) = \frac{\text{distance}(ZC) + \text{distance}(ZF)}{2} - \text{distance}(ZX)$$

where "X" refers to the central reference point of the model disc 29, whilst "Z" refers to a start point at coordinates of the machine located such that they correspond with the laser measurement device 5, the distance (ZX) constituting the central reference height.

The concavities of the three axes is then measured, thereby obtaining the concavity of the agricultural disc.

The values, corresponding to both concavity and twist, are compared with their respective tolerance values, thereby deciding whether or not the piece is acceptable.

As such, the machine and measurement method object of the invention reduce testing time (the time it takes the disc to complete one full turn) and increase precision, given that the testing does not rely on human ability.

Furthermore, using the data acquired, it is possible to check whether or not the manufacturing process employed to make the agricultural discs complies with the desired technical specifications.

As such, using the corresponding formula, it is possible to obtain short-term capacity indices, which indicate how suitable the manufacturing process is.

The invention claimed is:

1. A method for acquiring data for measuring twist and concavity of agricultural discs, characterized in that it comprises the following stages:
    a) placing a model disc in a center of a mounting bracket;
    b) positioning a laser measurement device in a central area of the model disc above the same;
    c) making the model disc rotate;
    d) obtaining reference data corresponding to points of the model disc located equidistant from a center of the model disc using a start point located in the laser measurement device;
    e) determining a central reference height that corresponds to the distance, perpendicular to the disc, from said center of the model disc to the start point;
    f) demounting the model disc;
    g) mounting an agricultural disc to be measured centrally on the mounting bracket, ensuring it is immobilized by means of lowering a hold-down plate;
    h) displacing the laser measurement device in order to position it such that it corresponds with a periphery of the agricultural disc;
    i) measuring the height of various independent points, and various pairs of diametrically opposed points, exclusively taken along the periphery of the agricultural disc;
    j) calculating a difference between the maximum and minimum heights, obtaining the twist of the agricultural disc;
    k) calculating an average of the heights of each pair of diametrically opposed peripheral points;
    l) comparing the average of each pair of diametrically opposed peripheral points to the central reference height of the model disc, obtaining a concavity in said diameter;
    m) calculating an average of different concavities measured, obtaining a concavity of the disc.

2. The method for acquiring data for measuring twist and concavity of agricultural discs according to claim 1, characterized in that it comprises the following steps:
    n) rotating the agricultural disc for a section of a second turn;
    o) lifting the hold-down plate;
    p) demounting the agricultural disc; and
    q) repeating steps g) to j) with at least one additional agricultural disc.

3. The method for acquiring data for measuring twist and concavity of agricultural discs according to claim 1, characterized in that it comprises the following steps:
    comparing the twist obtained with pre-established tolerance levels, in order to determine whether or not the agricultural disc is valid in terms of a twist variable.

4. The method for acquiring data for measuring twist and concavity of agricultural discs according to claim 1, characterized in that it comprises the following steps:
   comparing the concavity of the disc obtained with pre-established tolerance levels, in order to determine whether or not the agricultural disc is valid.

* * * * *